(12) United States Patent
Kosaki et al.

(10) Patent No.: US 6,216,743 B1
(45) Date of Patent: Apr. 17, 2001

(54) BELLOWS TUBE

(75) Inventors: Shinji Kosaki, Nagoya; Hiroyuki Kihira, Toyota; Susumu Suzuki, Okazaki, all of (JP)

(73) Assignee: Sango Co., Ltd., Nagoya (JP)

( * ) Notice: Subject to any disclaimer, the term of this patent is extended or adjusted under 35 U.S.C. 154(b) by 0 days.

(21) Appl. No.: 09/514,298

(22) Filed: Feb. 28, 2000

(30) Foreign Application Priority Data

Mar. 4, 1999 (JP) ................................................. 11-056904

(51) Int. Cl.⁷ ............................... F16L 11/00; F16L 9/00
(52) U.S. Cl. ............................ 138/121; 138/109; 138/118
(58) Field of Search ................................... 138/118, 119, 138/121, 122, 177, 109

(56) References Cited

U.S. PATENT DOCUMENTS

| 4,340,089 | 7/1982 | Freiherr von Arnim et al. ... 138/121 |
| 5,704,401 | * 1/1998 | Fukui et al. ...................... 138/119 X |

FOREIGN PATENT DOCUMENTS

| 0 493 680 A1 | 7/1992 | (EP) . |
| 0 736 714 A1 | 10/1996 | (EP) . |
| 61-235025 | 10/1986 | (JP) . |
| 1-166886 | 11/1989 | (JP) . |
| 8-28260 | 1/1996 | (JP) . |

* cited by examiner

Primary Examiner—Patrick Brinson
(74) Attorney, Agent, or Firm—Oliff & Berridge, PLC

(57) ABSTRACT

The present invention is directed to a bellows tube formed of metal having a cylindrical collar portion and a plurality of corrugations adjacent thereto with outwardly curved portions and inwardly curved portions alternately formed along the longitudinal axis of the tube. The bellows tube includes a bulged end portion which extends from a first outwardly curved portion of the outwardly curved portions toward the collar portion. The bulged end portion is bulged outward of the tube, with its outer diameter gradually reduced from the first outwardly curved portion to the collar portion. A connecting end portion is formed for connecting the bulged end portion with the collar portion, and the connecting end portion is curved inward of the tube. Preferably, the radius of curvature of the connecting end portion is smaller than the radius of curvature of the first outwardly curved end portion.

12 Claims, 6 Drawing Sheets

BELLOWS TUBE

BACKGROUND OF THE INVENTION

1. Field of the Invention

The present invention relates to a bellows tube, more specifically the bellows tube for use in an exhaust system of an automotive vehicle.

2. Description of the Related Arts

In general, a flexible tubular joint is employed in a vehicle exhaust system at a connecting portion of exhaust pipe, so as to absorb a vibration of an engine or a relative displacement between the engine and the exhaust pipe. Once a bending moment or shearing stress is applied to the flexible tubular joint, which may be called as a flexible tube, the moment and stress applied thereto will be the maximum at an end portion of the flexible tube, i.e., the connecting portion. In order to improve durability of the tube, various countermeasures have been proposed, heretofore. In Japanese Patent Laid-open Publication No.8-28260, for example, disclosed is a flexible tube which is formed of a metal tube 21 having a bellows portion 23 with a mountain portion 25 and a valley portion 27 formed alternately, wherein a circular arc portion 29 is formed on the top of the mountain portion 25 and the bottom of the valley portion 27, respectively. According to the Publication, it is proposed that the heights of the fourth mountain M4 and following mountains are made equal, and the heights of the third mountain M3, second mountain M2 and first mountain M1 are gradually lowered toward the end of the bellows portion 23, and that the radius of curvature of the circular arc portion 29 formed at a rising portion 31 of the first mountain M1 is made more than two times as large as the radius of curvature of the circular arc portion 29 formed at each top of the fourth mountain M4 and following mountains.

In Japanese Utility Model Laid-open Publication No.1-166886, with respect to a tube connecting apparatus for connecting one tube with the other one tube through a bellows tube, and protecting the outer side of the bellows tube by an outer protecting cylinder, it is proposed that a large diameter portion of the outermost end the bellows tube is made longer than other large diameter portions.

In Japanese Patent Laid-open Publication No.61-235025, there is disclosed a method for manufacturing an Ω-type bellows, which includes a first process for forming a tube blank to provide a U-shaped mountain portion and a straight tube portion crossed normal to the bottom of the mountain portion, with a predetermined space formed between them, a second process for compressing the tube blank in its axial direction by a predetermined length, with an inside pressure applied to the tube blank formed by the first process, and a third process for applying high pressure into the tube blank for a predetermined period, with the tube blank compressed.

According to the flexible tubular joints disposed in the exhaust pipe of the vehicle including the flexible tube as disclosed in the publications listed above, outwardly curved portions of a metal tube (designated as the mountain portion in the Publication No.8-28260) which are curved outward of the metal tube, and inwardly curved portions (designated as the valley portion in that Publication) which are curved inward of the metal tube, are formed to provide a generally Ω-shaped cross section, respectively, to improve a resiliency.

In the Publication No.8-28260, it is aimed to lessen a concentration of stress to the end portion, by enlarging the radius of curvature of the circular arc portion formed at the rising portion of the first mountain. As a result, a damage can be avoided at the rising portion, but a possible damage may be made at a portion near the top of the first mountain. This is because, the mountain portion of the first mountain is formed on the metal tube by a general bulging process, so that the thickness of the bulged first mountain is reduced comparing with that of the metal tube before it is bulged, and also because an inflection point is made on a connecting portion between the first mountain and the end of the rising portion following the first mountain, to weaken a portion at the point. Furthermore, if a bending deformation is made on the flexible tube, the stress will be concentrated on the portion near the top of the first mountain. Therefore, the tube is likely to be broken at the inflection point.

SUMMARY OF THE INVENTION

Accordingly, it is an object of the present invention to provide a bellows tube formed of metal having a cylindrical collar portion and a plurality of corrugations adjacent thereto with outwardly curved portions and inwardly curved portions alternately formed along the longitudinal axis of the tube, wherein an end portion of the corrugations is formed in a shape capable of withstanding repeated loads appropriately, to provide a sufficient durability.

It is another object of the present invention to provide a method for forming the bellows tube.

In accomplishing the above and other objects, a bellows tube formed of metal includes a cylindrical collar portion and a plurality of corrugations adjacent thereto with outwardly curved portions and inwardly curved portions alternately formed along the longitudinal axis of the tube. The bellows tube further includes a bulged end portion extending from a first outwardly curved portion of the outwardly curved portions toward the collar portion. The bulged end portion is bulged outward of the tube, with the outer diameter of the bulged end portion gradually reduced from the first outwardly curved portion to the collar portion. And, a connecting end portion is formed to connect the bulged end portion with the collar portion, and formed to be curved inward of the tube.

Preferably, the radius of curvature of the connecting end portion is smaller than the radius of curvature of the first outwardly curved end portion.

The outwardly curved portions, inwardly curved portions, and connecting end portion are preferably formed to provide a substantially circular cross section, respectively.

The outwardly curved portions and inwardly curved portions are preferably formed to provide a generally Ω-shaped cross section, respectively.

And, a method is provided for forming a straight metal tube to produce a bellows tube having a cylindrical collar portion and a plurality of corrugations adjacent thereto, with outwardly curved portions and inwardly curved portions alternately formed along the longitudinal axis of the metal tube. The method is achieved by forming a bulged end portion extending from a first outwardly curved portion of the outwardly curved portions toward the collar portion, and bulged outward of the metal tube, with the outer diameter of the bulged end portion gradually reduced from the first outwardly curved portion to the collar portion, and forming a connecting end portion for connecting the bulged end portion with the collar portion, to be curved inward of the metal tube.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
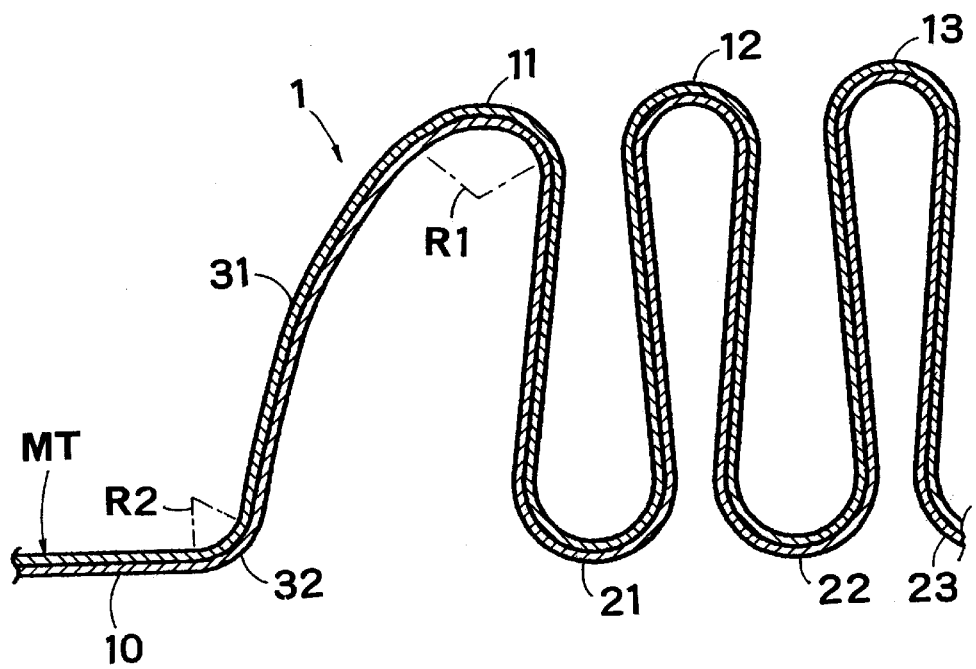
FIG. 1 is an enlarged cross sectional view of a part of a bellows tube according to an embodiment of the present invention.
Figure 2:
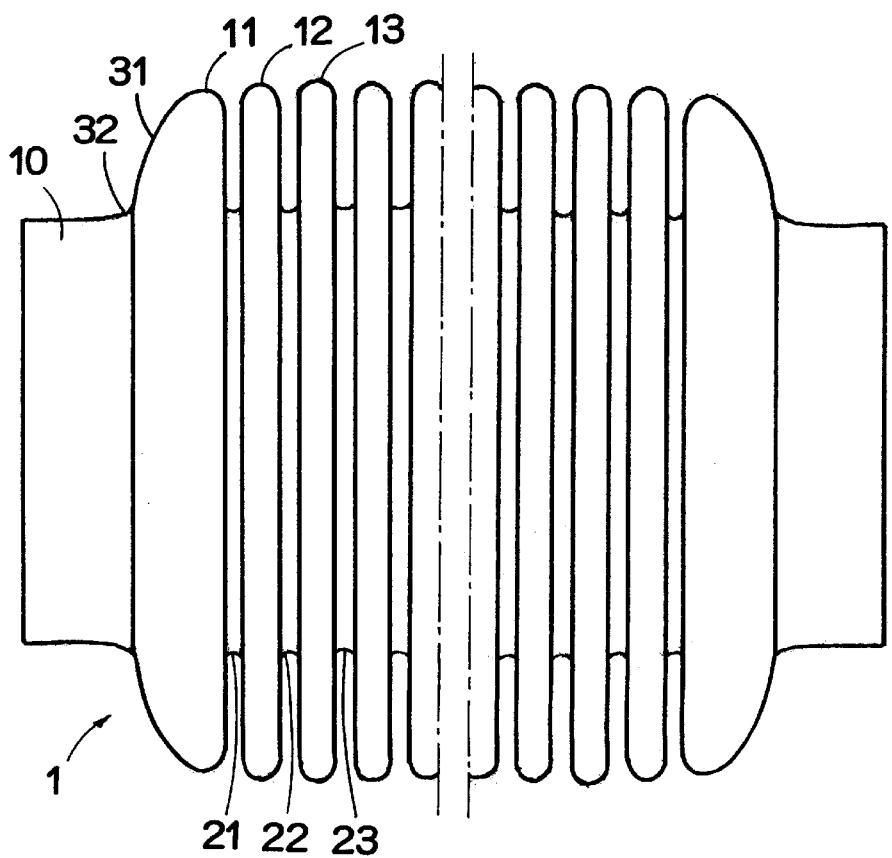
FIG. 2 is a front view of a bellows tube according to an embodiment of the present invention.

Referring to FIG. 2, there is illustrated a bellows tube according to an embodiment of the present invention, a part of which is sectioned and enlarged in FIG. 1. According to the present embodiment, a bellows tube 1 has a bellows portion which is formed in the middle of a duplex metal tube MT (hereinafter simply referred to as a metal tube MT), and a cylindrical collar portion 10 formed on the opposite ends of the bellows portion, respectively. On the bellows portion, are formed a plurality of outwardly curved portions (11 and so on) and inwardly curved portions (21 and so on).

In the bellows portion as shown in the enlarged cross section thereof in FIG. 1, which is a sectional view of the metal tube MT sectioned along the longitudinal axis, there are alternately formed, a first outwardly curved portion 11, second outwardly curved portion 12, third outwardly curved portion 13 and the like, which are curved outward of the metal tube MT to provide a generally Ω-shaped cross section, respectively, and a first inwardly curved portion 21, second inwardly curved portion 22, third inwardly curved portion 23 and the like, which are curved inward of the metal tube MT to provide the generally Ω-shaped cross section, respectively. And, a bulged end portion 31 is formed to extend from the first outwardly curved portion 11, which is formed adjacent to the collar portion 10, toward the collar portion, with the outer diameter of the bulged end portion 31 gradually reduced from the first outwardly curved portion 11 to the collar portion 10, and bulged outward of the metal tube MT. The bulged end portion 31 is connected to the collar portion 10 through a connecting end portion 32.

The connecting end portion 32 is formed to be curved inward of the metal tube MT. According to the present embodiment, the radius of curvature R2 of the connecting end portion 32 is set to be smaller than the radius of curvature R1 of the first outwardly curved portion 11. The outwardly curved portions (11 and so on), inwardly curved portions (21 and so on), and the connecting end portion 32 are formed to provide a circular cross section, or approximately circular cross section, respectively.

Figure 3:
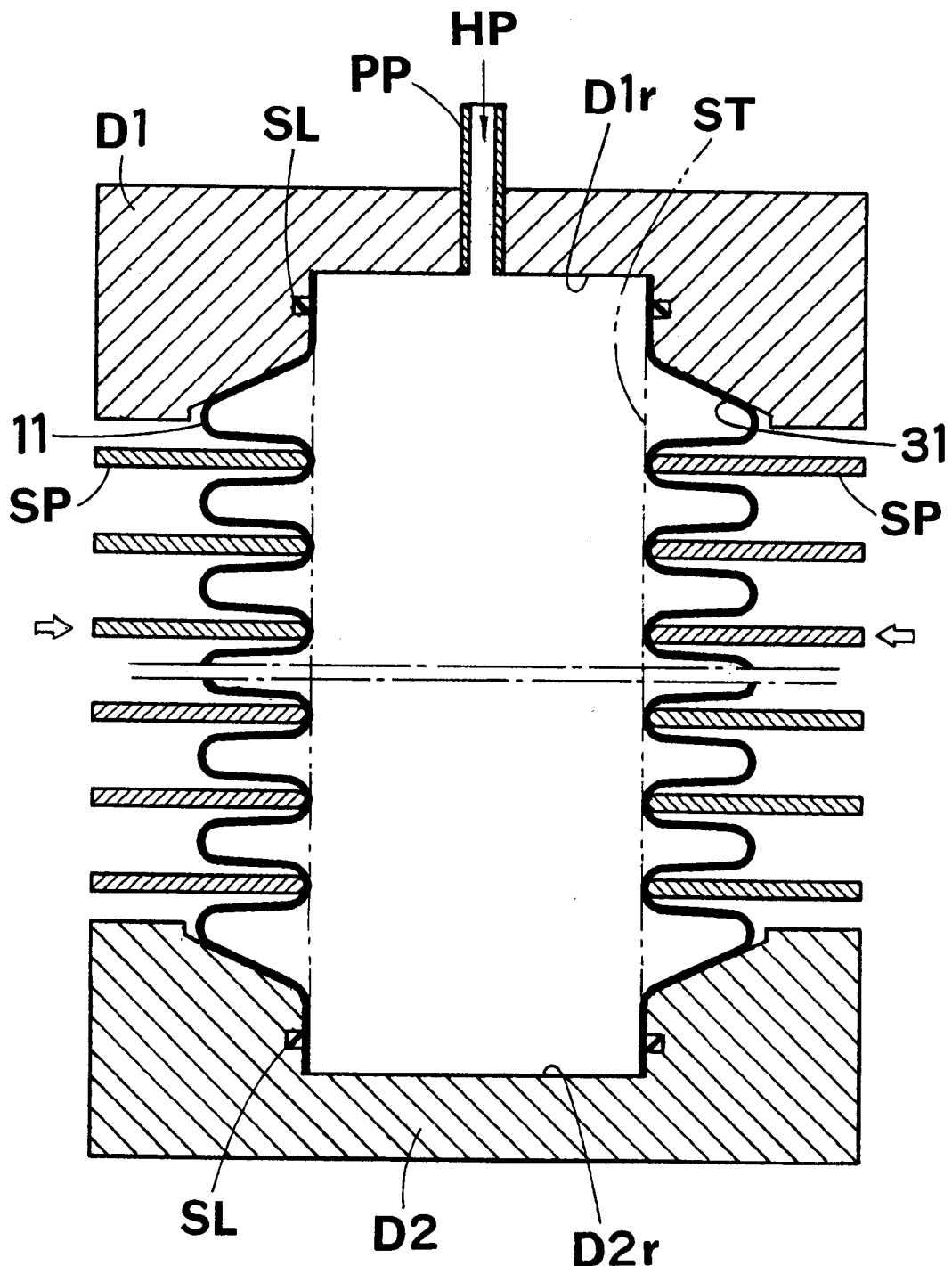
FIG. 3 is a cross sectional view of a bellows tube for illustrating a forming process of the bellows tube according to an embodiment of the present invention.
Figure 4:
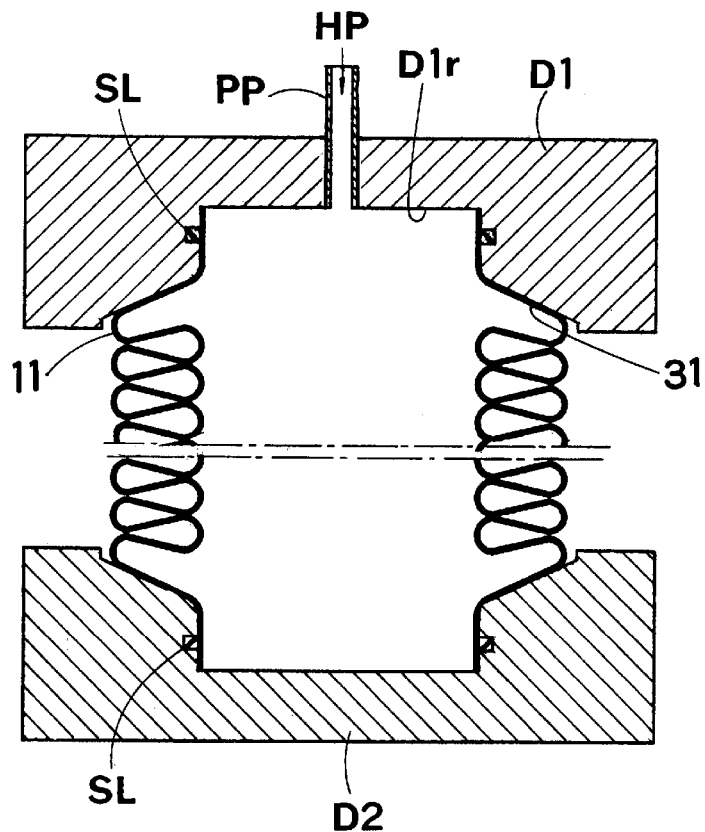
FIG. 4 is a cross sectional view of a bellows tube for illustrating a compressing process of the bellows tube according to an embodiment of the present invention.
Figure 5:
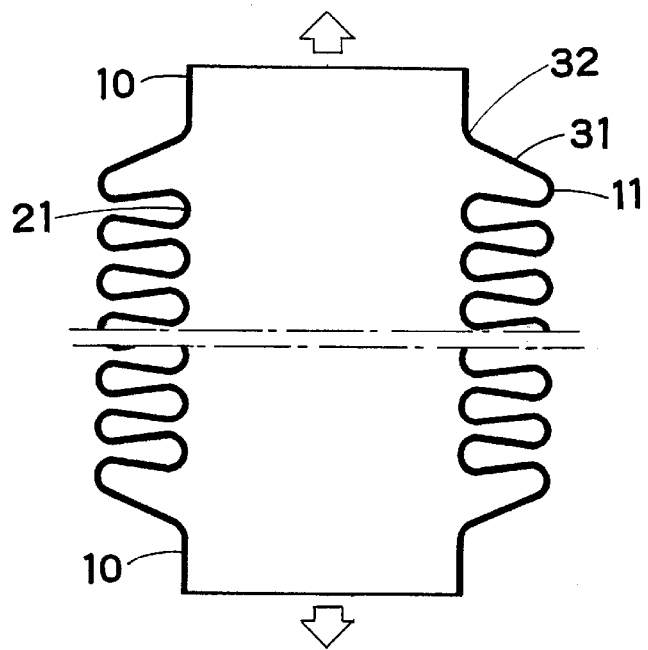
FIG. 5 is a cross sectional view of a bellows tube for illustrating a returning process with a spring back according to an embodiment of the present invention.

FIGS. 3–5 illustrate a manufacturing process of the bellows tube according to the present embodiment. At the outset, according to a forming process as shown in FIG. 3, placed between dies D1 and D2 is a straight duplex metal tube ST, the outer configuration of which is shown by two-dot chain lines in FIG. 3. The dies D1, D2 are formed at the insides thereof with recesses D1r, D2r, respectively, open end portions of which are formed to provide tapered surfaces which are to be in contact with the bulged end portion 31 to be formed as shown in FIG. 1, respectively. The die D1 is provided with a conduit PP, through which hydraulic pressure (indicated by HP in FIG. 3) is introduced into the straight tube ST. The straight tube ST is held fluid-tightly between the dies D1, D2 by means of sealing members SL, SL. Between the dies D1 and D2, a plurality of spacers (represented by SP) are located to be spaced from each other by a predetermined distance, along the longitudinal axis of the straight tube ST, and supported to be movable perpendicularly to the axis of the straight tube ST. Each spacer SP is adapted to move perpendicularly to the axis of the straight tube ST in a direction as indicated by a blank arrow in FIG. 3, in accordance with a movement of the die D1 moving toward the die D2, or a movement of the dies D1 and D2 moving toward each other.

Accordingly, with the hydraulic pressure introduced into the straight tube ST through the conduit PP, the die D1 is moved toward the die D2, or the dies D1 and D2 are moved toward each other. Simultaneously, in accordance with the movement of the die D1 toward the die D2, each spacer SP is moved toward the axis of the straight tube ST. As a result, each portion of the straight tube ST located between adjacent spacers SP is bulged outwardly, and each portion of the straight tube ST located in contact with each spacer SP is prevented from being bulged outwardly, thereby to form the straight tube ST into a bellows tube. In this process, the dies D1, D2 formed as shown in FIG. 3 are employed, so that the axial end portion of the bellows tube 1 is formed appropriately, without causing its buckling. As described before, the dies D1, D2 are formed at the insides thereof with recesses D1r, D2r, respectively, the open end portions of which are formed to provide the tapered surfaces, and the axial end portions of the bellows tube 1 are pressed by the tapered surfaces to form the bulged end portions 31, so that the material of the straight tube ST is guided smoothly, to form the bellows tube 1 at a proper form accuracy, with reduction of the thickness of each portion minimized.

Next, the spacers SP are removed, and in a pressing process as shown in FIG. 4, the die D1 is moved toward the die D2, or the dies D1 and D2 are moved toward each other, without the hydraulic pressure applied in the straight tube ST, until adjacent side surfaces of the curved portions facing each other will contact with each other. In this case, the bulged end portion 31 is formed with a tapered surface at each axial end portion of the bellows tube 1 to provide a high stiffness, so that any unexpected deformation will not be caused, thereby to obtain a proper form accuracy of the bellows tube 1 as a whole. Furthermore, by forming the radius of curvature R2 of the connecting end portion 32 as small as possible and forming the bulged end portion 31 as long as possible, the form accuracy will be improved more.

Then, when the dies D1, D2 are removed, the bellow tube 1 is expanded by so-called spring back, in such a direction that the collar portions 10 formed at the opposite ends will be apart from each other, as indicated by a blank arrow in FIG. 5. Therefore, in the pressing process as described before with reference to FIG. 4, the pressing force is applied in view of the prospective increasing amount of the space between the adjacent curved portions expanded by the spring back, such that when the bellows tube 1 is made free from the compressed state, it will be of a desired dimension. In FIG. 5, the bulged end portion 31 is illustrated to be approximately plane. In fact, however, when the dies D1, D2 are removed, the bulged end portion 31 is expanded by the spring back to provide a convex surface which is bulged outward of the metal tube MT as shown in FIG. 1. As described before, the open end portions of the recesses D1r, D2r of dies D1, D2 are preferably formed to provide the tapered surfaces, whereas they may be formed to provide concave surfaces corresponding to the outer configuration of the bulged end portion 31 as shown in FIG. 1, respectively.

Figure 6:
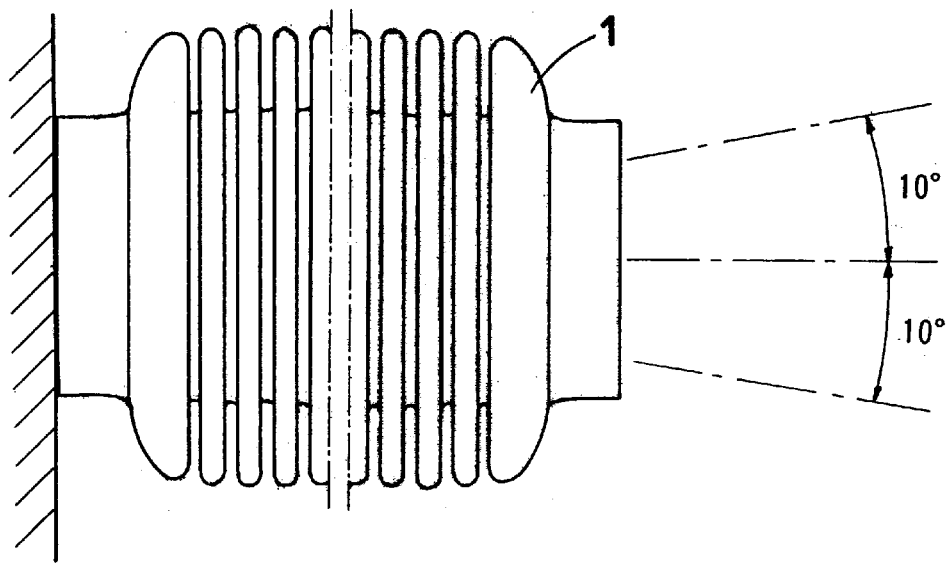
FIG. 6 is a front view of a bellows tube according to an embodiment of the present invention, to be bent repeatedly for experimenting the tube.
Figure 7:
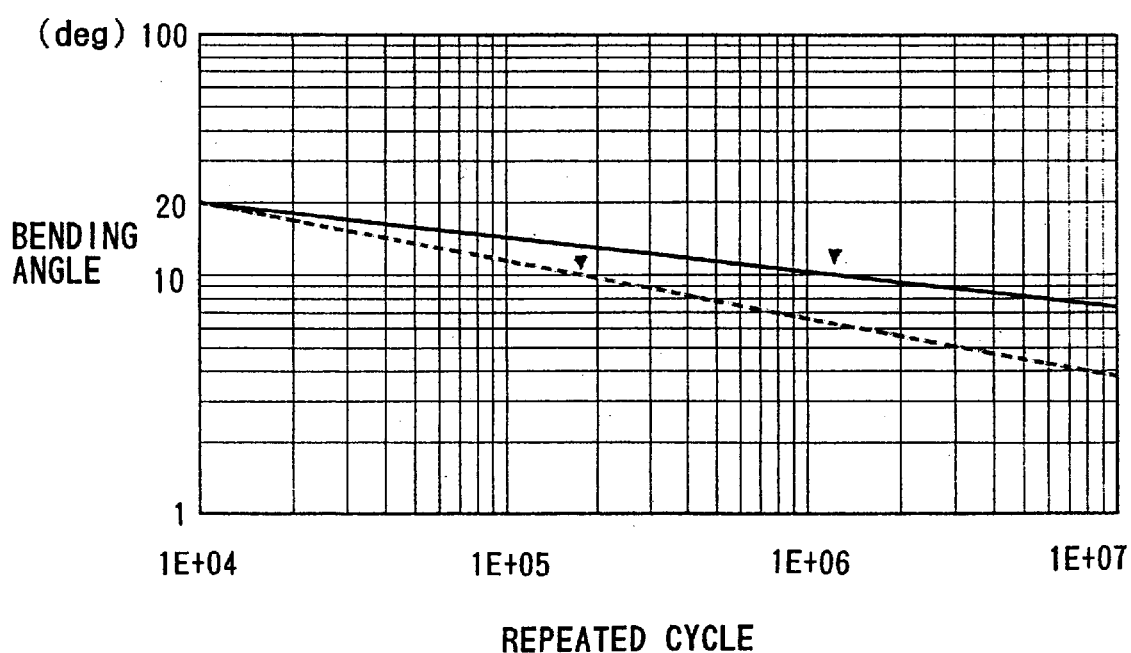
FIG. 7 is a diagram illustrating an experimental result of a bellows tube according to an embodiment of the present invention.

For example, based upon a duplex metal tube which is made of stainless steel tubes having a thickness of 0.3 mm to form two layers, according to the method as described above, the bellows tube 1 is formed to provide the outer diameter of 76 mm and inner diameter of 46 mm of the bellows portion, the radius of curvature of 1.9 mm of the connecting end portion, and the radius of curvature of 2.1 mm of the first outwardly curved portion. The strength of this bellows tube 1 is extremely increased comparing with the conventional bellows tube. For example, through such an experiment that the bellows tube 1 is cantilevered as shown in FIG. 6, and bent repeatedly, with a bending angle of 10 degrees upward and downward, respectively, it has been found that the bellows tube 1 of the present embodiment was not broken up to 1,200,000 times bending motions, while the conventional bellows tube was broken at approximately 170,000 times bending motions. FIG. 7 shows the result of the experiment, wherein in the case where the bending angle to the bellows tube is set at the outset to be 20 degrees, then gradually decreased, the repeated cycle of the bending operations is indicated when the bellows tube was broken. In FIG. 7, a solid line indicates the result as to the present embodiment, and the broken line indicates the result as to the conventional bellows tube. It has been also found that the bending angle capable of assuring that the conventional bellows tube would not be broken almost permanently was up to 4 degrees, whereas the bending angle capable of assuring that the bellows tube 1 of the present embodiment would not be broken almost permanently is up to 8 degrees, so that the upper limit of the bending angle is extremely increased.

Figure 8:
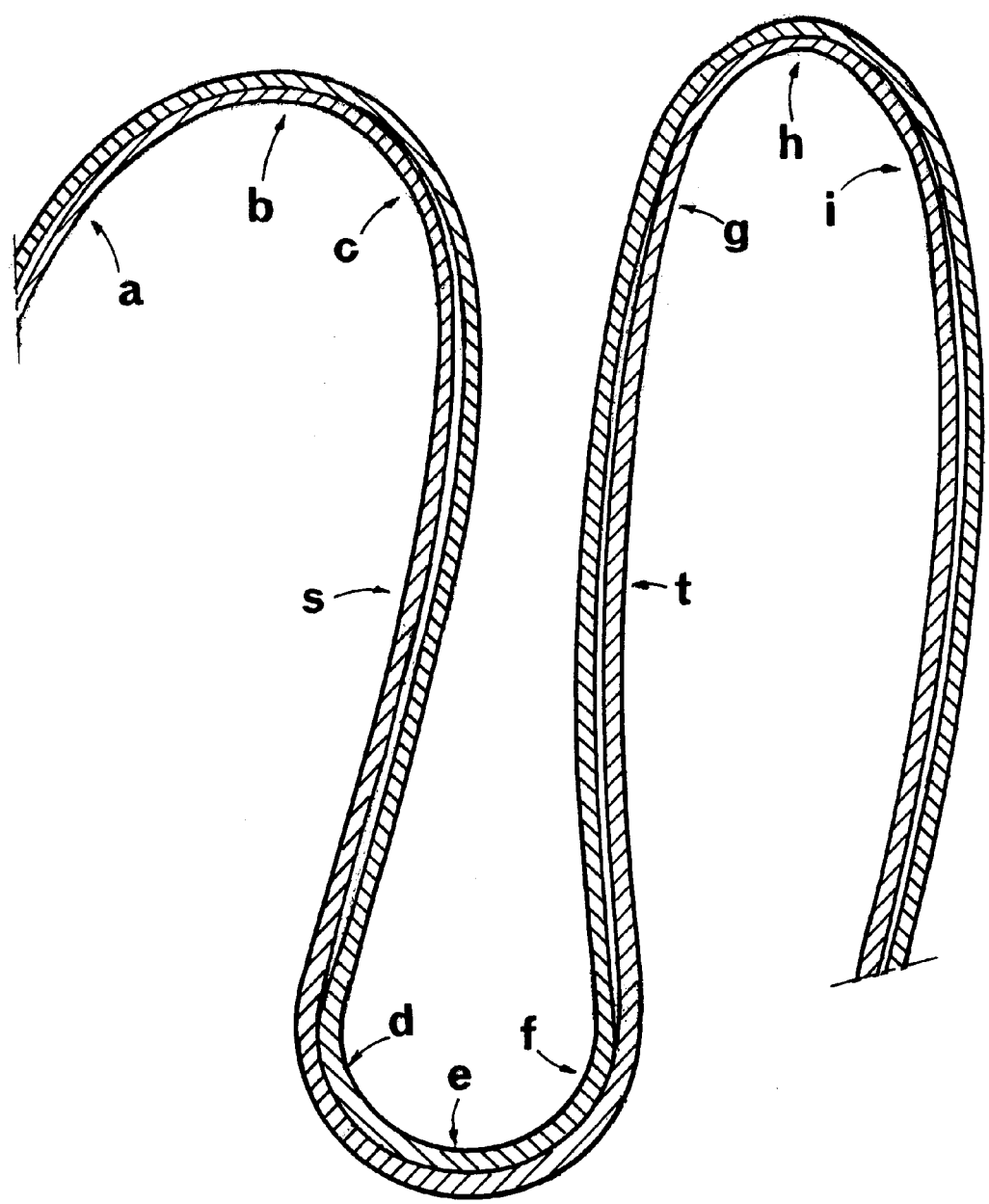
FIG. 8 is an enlarged cross sectional view of a part of a conventional bellows tube.
Figure 9:
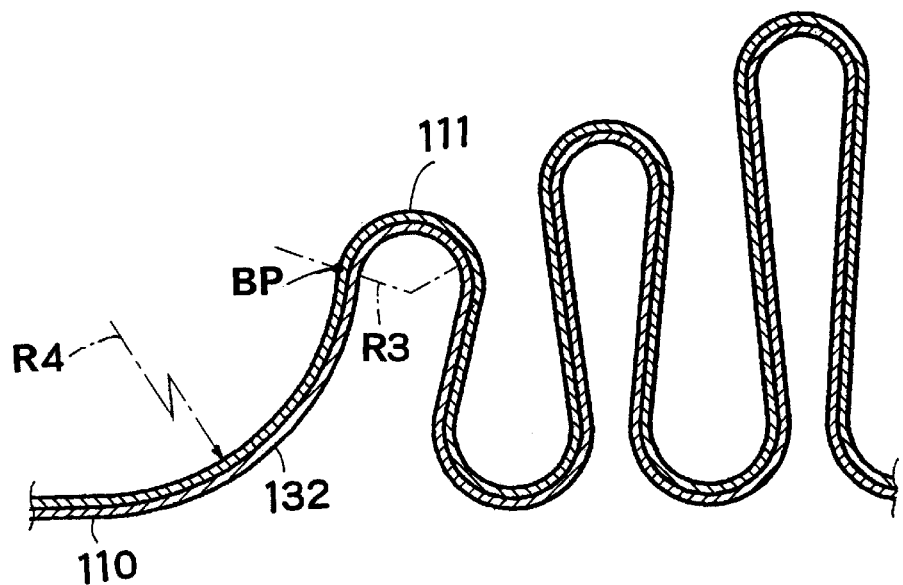
FIG. 9 is a cross sectional view of a part of a conventional bellows tube.

FIGS. 8 and 9 illustrate a part of the conventional bellows tube to be compared with the present embodiment. As enlarged in FIG. 8, the thickness of each portion of (a, b, c, g, h, i) adjacent to the top of the outwardly curved portion is thinner than the thickness of each portion of (s, t) for connecting them. Furthermore, as shown in FIG. 9, the radius of curvature R4 of a connecting end portion 132 adjacent to a collar portion 110 is set to be larger than the radius of curvature R3 of a first outwardly curved portion 111, but the curved directions of them are opposite, so that an inflection point BP is necessarily made between the connecting end portion 132 and the first outwardly curved portion 111. The inflection point BP is the thin portion as indicated by "a" in FIG. 8, and it is the point that is weakest to the bending displacement, so that a possibility of breaking at that point will be very high.

In contrast, according to the present embodiment, the bulged end portion 31 is formed to extend in the same direction as the first outwardly curved portion 11, no inflection point will be made between them, so that it can withstand the bending displacement sufficiently. The bulged end portion 31 is connected to the collar portion 10 through the connecting end portion 32 which has the radius of curvature R2 smaller than the radius of curvature R1 of the first outwardly curved portion 11, and which is curved in a direction opposite to the first outwardly curved portion 11, a stress will be concentrated on the connecting end portion 32, which is thick enough to withstand the stress, whereby the concentration of stress to the first outwardly curved portion 11 can be relatively lessened. By enlarging the axial length of the bulged end portion 31 of the bellows tube 1, the stress at the area of the thin first outwardly curved portion 11 can be lessened, so that the durability of the bellows tube 1 is improved more. Consequently, it is desirable to make the radius of curvature R2 of the connecting end portion 32 as small as possible, and make the length of the bulged end portion 31 as long as possible.

Figure 10:
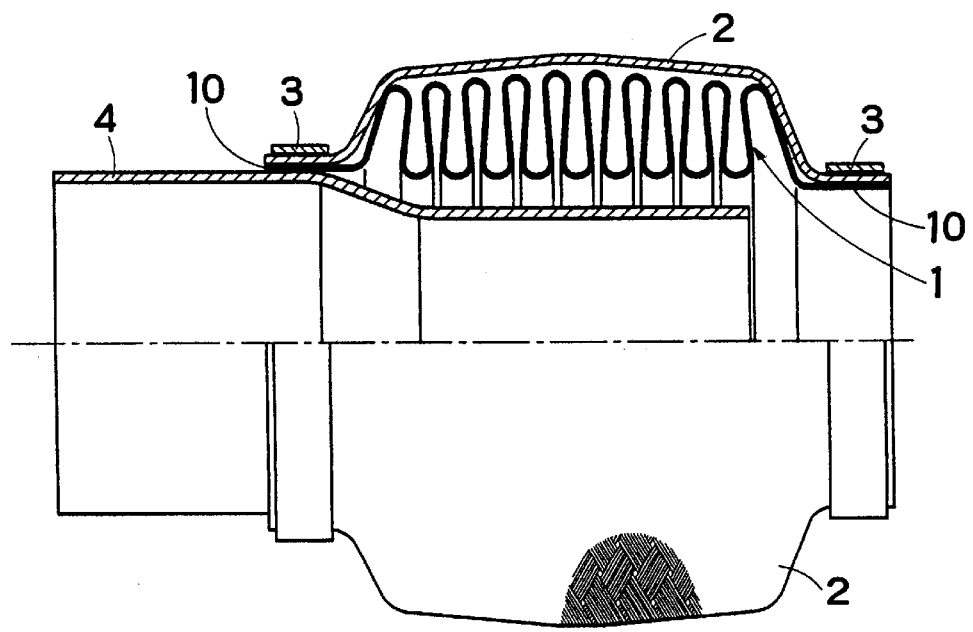
FIG. 10 is a front view of a part of a vehicle exhaust system with an upper part thereof sectioned according to an embodiment of the present invention.

FIG. 10 illustrates a flexible joint for an exhaust system of a vehicle, into which the bellows tube 1 is incorporated. The flexible joint includes a braid member 2 for covering the bellows tube 1 to protect the same from being damaged by a flying gravel or the like, and an inner pipe 4 extending into the bellows tube 1 to protect the bellows tube 1 from being directly exposed to exhaust gas. The braid member 2 is braided by metal wire to form a cylinder, with opposite ends thereof fixed to the collar portions 10, 10 of the bellows tube 1 by annular rings 3, 3. As shown in FIG. 10, it is preferable that the bellows tube 1 is formed such that the outer diameter of the bellows portion, or the height thereof is gradually increased from the ends to a central area of the bellows portion, to distribute the stress applied thereto.

In general, according to a conventional flexible joint with a conventional bellows tube covered by a conventional braid member (not shown), the bellows tube is pulled by the braid member, so that stress is concentrated on the first outwardly curved portion of the bellows tube. As a result, the durability of the bellows tube will be extremely lessened, comparing with the one without the braid member. In contrast, the bellows tube 1 according to the present embodiment has the first outwardly curved portion 11 capable of withstanding the concentration of stress sufficiently, so that the durability of the bellows tube 1 will be hardly lessened.

By placing one or a plurality of aforementioned flexible joints at appropriate positions in the exhaust system, therefore, vibrations of an engine can be prevented from being transmitted to an exhaust pipe, and then to the interior of the vehicle, to provide the exhaust system with high vibration preventing property and durability.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A bellows tube formed of metal having a cylindrical collar portion and a plurality of corrugations adjacent thereto with outwardly curved portions and inwardly curved portions alternately formed along the longitudinal axis of said tube, comprising:

a bulged end portion extending from a first outwardly curved portion of said outwardly curved portions toward said collar portion, said bulged end portion being bulged outward of said tube, with the outer diameter of said bulged end portion gradually reduced toward said collar portion from said first outwardly curved portion to said collar portion; and a connecting end portion for connecting said bulged end portion with said collar portion, said connecting end portion being curved inward of said tube.

2. The bellows tube of claim 1, wherein the radius of curvature of said connecting end portion is smaller than the radius of curvature of said first outwardly curved end portion.

3. The bellows tube of claim 1, wherein said outwardly curved portions, said inwardly curved portions, and said connecting end portion are formed to provide a substantially circular cross section, respectively.

4. The bellows tube of claim 3, wherein said outwardly curved portions and said inwardly curved portions are formed to provide a generally Ω-shaped cross section, respectively.

5. The bellows tube of claim 1, wherein said tube is a duplex metal tube.

6. A method for forming a straight metal tube to produce a bellows tube having a cylindrical collar portion and a plurality of corrugations adjacent thereto, with outwardly curved portions and inwardly curved portions alternately formed along the longitudinal axis of said metal tube, comprising:

forming a bulged end portion extending from a first outwardly curved portion of said outwardly curved portions toward said collar portion, and bulged outward of said metal tube, with the outer diameter of said bulged end portion gradually reduced toward said collar portion from said first outwardly curved portion to said collar portion; and forming a connecting end portion for connecting said bulged end portion with said collar portion, to be curved inward of said metal tube.

7. The method of claim 6, wherein the radius of curvature of said connecting end portion is formed to be smaller than the radius of curvature of said first outwardly curved end portion.

8. The method of claim 6, wherein said outwardly curved portions, said inwardly curved portions, and said connecting end portion are formed to provide a substantially circular cross section, respectively.

9. The method of claim 8, wherein said outwardly curved portions and said inwardly curved portions are formed to provide a generally Ω-shaped cross section, respectively.

10. The method of claim 6, wherein said metal tube to be formed is a duplex metal tube.

11. A method for forming a straight metal tube to produce a bellows tube having a cylindrical collar portion and a plurality of corrugations adjacent thereto, with outwardly curved portions and inwardly curved portions alternately formed along the longitudinal axis of said metal tube, comprising:

forming a bulged end portion extending from a first outwardly curved portion of said outwardly curved portions toward said collar portion, and bulged outward of said metal tube, with the outer diameter of said bulged end portion gradually reduced from said first outwardly curved portion to said collar portion;

forming a connecting end portion for connecting said bulged end portion with said collar portion, to be curved inward of said metal tube; and wherein said metal tube is placed between a pair of dies supported to be movable toward and away from each other and formed at the sides thereof facing each other with recesses, respectively, open end portions of said recesses being formed to provide tapered surfaces to be in contact with said bulged end portion to be formed, and wherein said bulged end portion is formed by a spring back created when said dies are removed from said metal tube compressed between said dies.

12. A method for forming a straight metal tube to produce a bellows tube having a cylindrical collar portion and a plurality of corrugations adjacent thereto with outwardly curved portions and inwardly curved portions alternately formed along the longitudinal axis of said metal tube, comprising:

forming a bulged end portion extending from a first outwardly curved portion of said outwardly curved portions toward said collar portion, and bulged outward of said metal tube, with the outer diameter of said bulged end portion gradually reduced from said first outwardly curved portion to said collar portion;

forming a connecting end portion for connecting said bulged end portion with said collar portion, to be curved inward of said metal tube; and wherein said metal tube is placed between a pair of dies supported to be movable toward and away from each other and formed at the sides thereof facing each other with recesses, respectively, open end portions of said recesses being formed to provide concave surfaces corresponding to the outer configuration of said bulged end portion.

* * * * *